United States Patent [19]
Nishimoto et al.
[11] 3,876,988
[45] Apr. 8, 1975

[54] ASSOCIATIVE MEMORY

[75] Inventors: Tetsunori Nishimoto, Kawasaki; Akira Masaki, Kodaira, both of Japan

[73] Assignee: Hitachi, Ltd., Tokyo, Japan

[22] Filed: Mar. 2, 1973

[21] Appl. No.: 337,577

[30] Foreign Application Priority Data

Mar. 6, 1972 Japan ................................ 47-22273

[52] U.S. Cl. ... 340/173 FF; 307/238; 340/173 AM; 307/291

[51] Int. Cl. ............................................ G11c 11/40

[58] Field of Search ............... 340/173 FF, 173 AM; 307/291

[56] References Cited

UNITED STATES PATENTS 3,218,613 11/1965 Gribble ........................ 340/173 AM
3,573,756 4/1971 Hillis ........................... 340/173 AM
3,634,833 1/1972 Dunn ........................... 340/173 AM
3,643,236 2/1972 Kolankowsky ............. 340/173 AM
3,704,456 11/1972 Hughes ........................ 340/173 AM

*Primary Examiner*—Terrell W. Fears
*Attorney, Agent, or Firm*—Craig & Antonelli

[57] ABSTRACT

An associative memory comprising a bistable circuit including a couple of multi-emitter transistors each having at least two emitters, the base and collector of one of said transistors being electrically connected respectively with the collector and base of the other transistor, ternary level voltages being applied to the emitters of each of said transistors as required thereby performing association.

4 Claims, 9 Drawing Figures

ASSOCIATIVE MEMORY

BACKGROUND OF THE INVENTION

1. Field of the Invention

This invention relates to an associative memory for use in a data processing system such as a computer or more in particular to an associative memory comprising a couple of multi-emitter transistors.

2. Description of the Prior Art

The associative memory of this type is one which comprises a multiplicity of associative memory cells arranged in a matrix as a component element of the data processing system to perform retrieval according to stored information. For example, information supplied from the operation control section of the data processing system is compared with the information stored in the associative memory to retrieve information required for data classification or other purposes.

A well known conventional associative memory of this type comprises a multiplicity of memory cells each having a bistable circuit including a couple of multi-emitter transistors, an AND circuit including four diodes and two transistors and a read circuit including two diodes and one transistor, in such a manner that the content stored in the bistable circuit is searched according to the information supplied from an external source and the result is taken out of the AND circuit while the content stored in the bistable circuit is read out by the read circuit.

In the above-described conventional arrangement, each memory cell requires at least five transistors and six diodes, and the requirement for component elements is such that it is very difficult to achieve large scale integration of the associative memory.

SUMMARY OF THE INVENTION

Accordingly, it is an object of the present invention to provide an associative memory requiring only a small number of component elements.

Another object of the invention is to provide an associative memory capable of being highly integrated.

In order to achieve the above-mentioned objects, the memory cell according to the invention comprises only a bistable circuit and ternary level signals are applied to the bistable circuit.

DESCRIPTION OF THE PREFERRED EMBODIMENTS

Figure 1:
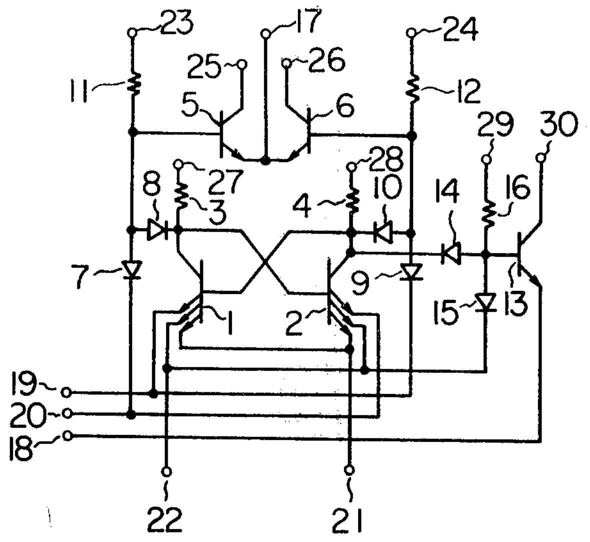
FIG. 1 PRIOR ART
FIG. 1 is a circuit diagram showing the arrangement of a memory cell of a conventional associative memory.

A typical arrangement of a memory cell of the conventional associative memory including multi-emitter transistors is shown in FIG. 1.

As illustrated in the figure, the associative memory cell comprises a bistable circuit including multi-emitter transistors 1, 2 and resistors 3, 4, an AND circuit including transistors 5 and 6, diodes 7 to 10 and resistors 11, 12, and a read circuit including a transistor 13, diodes 14, 15 and a resistor 16. Reference numeral 17 shows an output terminal of the AND circuit, numeral 18 an output terminal of the read circuit, numerals 19 to 22 control terminals and numerals 23 to 30 power terminals.

Explanation will be made now of the operation of the above-described associative memory. It is assumed that when the transistor 1 is in a conductive state and the transistor 2 is in a cut-off state, the information of logic 1 is stored in the memory cell, whereas when the transistor 2 is in a conductive state and the transistor 1 is in a cut-off state, the information of logic 0 is stored therein.

First, the association operation will be explained to determine or associate whether the information stored in the memory cell coincides with the information supplied from an external source for comparison.

A sufficiently low voltage is applied to the terminal 21 so as to maintain the information of the memory cell unchanged, whereas a sufficiently high voltage is applied to the terminal 20 if the information supplied from an external source is logic 1. When the information of logic 1 is stored in the memory cell, the diode 7 is cut off and the diode 8 conducts thereby to reduce the base voltage of the transistor 5. The base-emitter voltage of the transistor 5 is maintained constant and therefore with the decrease of the base voltage, the emitter voltage also decreases thereby to produce a sufficiently low voltage at the output terminal 17.

Also, when the information of logic 0 is stored in the memory cell, both the diodes 7 and 8 are cut off and the base voltage of the transistor 5 increases. As a result, a sufficiently high voltage is produced at the output terminal 17.

If the information supplied from an external source is logic 0, by contrast, a sufficiently high voltage is applied to the terminal 19. When the information of logic 1 is stored in the memory cell, both the diodes 9 and 10 are cut off thereby to increase the base voltage of the transistor 6, resulting in a sufficiently high voltage being produced at the output terminal 17.

Also, when the information of logic 0 is stored in the memory cell, the diode 9 is cut off while the diode 10 conducts and as a result the base voltage of the transistor 6 is reduced to produce a sufficiently low voltage at the output terminal 17.

As will be apparent from the above explanation, a sufficiently high voltage is produced at the output terminal 17 only when the information supplied from an external source does not coincide with the information stored in the memory cell. In this way, it is possible to perform associative operation by reference to the level of the voltage produced at the output terminal 17.

Explanation will be made now of the operation of reading out the information stored in the memory cell. The sufficiently high voltage is applied to the terminal 22 to cut off the diode 15. When the information of logic 1 is stored in the memory cell, the diode 14 is cut off and the base voltage of the transistor 13 is increased so that a sufficiently high voltage is produced at the output terminal 18.

On the other hand, when the information of logic 0 is stored in the memory cell, the diode 14 conducts and the base voltage of the transistor 13 is decreased so as to produce a sufficiently low voltage at the output terminal 18. As a consequence, the information stored in the memory cell is detected on the basis of whether the voltage at the output terminal 18 is high or low.

In the next place, reference is made to the manner in which information is written in the memory cell.

A sufficiently high voltage is applied to the terminal 22 and a sufficiently low voltage is impressed on the terminal 19 or 20 depending on the information to be stored. In other words, when the logic 1 is to be stored in the memory cell, a sufficiently low voltage is applied to the terminal 19 thereby to make the transistor 1 conductive. If the logic 0 is to be stored in the memory cell, a sufficiently low voltage is applied to the terminal 20, thereby causing the transistor 2 to conduct.

The above-described memory cell comprises five transistors, six diodes and five resistors. There is no doubt this constitutes a great obstacle to successful large scale integration of the associative memory.

Figure 2:
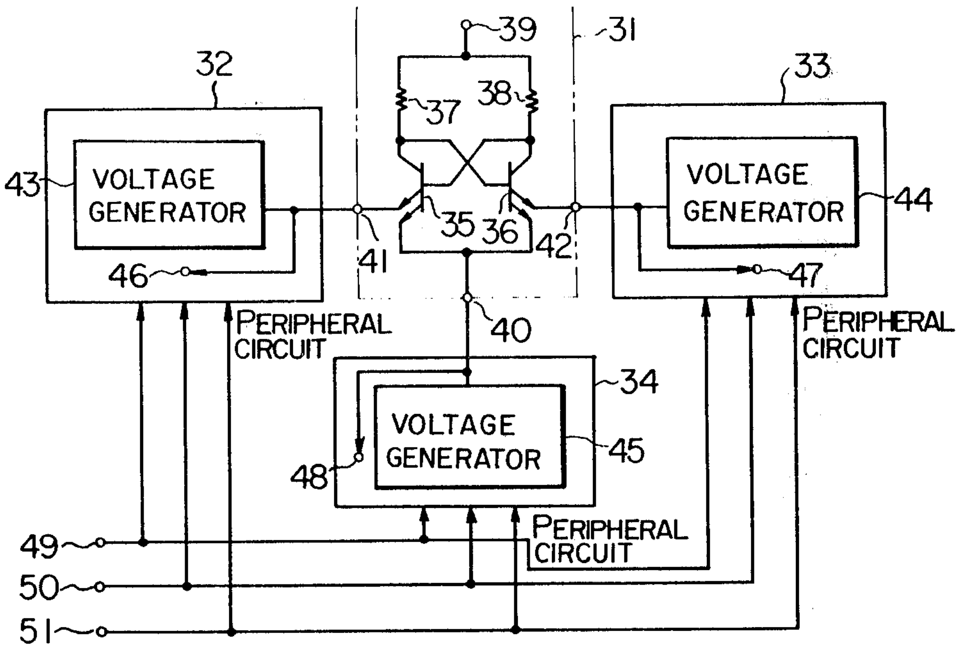
FIG. 2 is a diagram showing the arrangement of the associative memory according to an embodiment of the present invention.

FIG. 2 shows an embodiment of the invention, that is, a memory cell of the associative memory according to the invention and peripheral circuits arranged around it. Reference numeral 31 shows a memory cell comprising multi-emitter transistors 35 and 36 each including two emitters and resistors 37 and 38. The collector of one of the transistors is connected to the base of the other transistor and vice versa. The collectors of the transistors 35 and 36 are connected to terminals of the resistors 37 and 38, respectively. The other terminals of the resistors 37 and 38 are connected to a common terminal 39 of a power supply. One of the emitters of each transistor is connected to a common control terminal 40, while the other emitters of the transistors 1 and 2 are connected to control terminals 41 and 42, respectively.

Reference numerals 32, 33 and 34 show the peripheral circuits connected to the control terminals 41, 42 and 40, respectively, and these peripheral circuits 32, 33 and 34 are provided with voltage generators 43, 44 and 45 and output terminals 46, 47 and 48 respectively and are controlled by control signals from the control terminals 49, 50 and 51, respectively. In this way, output signals from the output terminals 46, 47 and 48 are detected and the voltages from the voltage generators are selectively produced.

Figure 3:
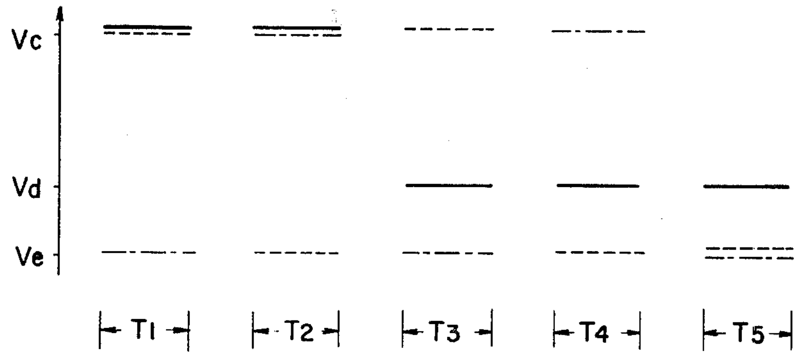
FIG. 3 is a characteristic diagram for explaining the operation of the associative memory shown in FIG. 2.

Levels of voltages applied to the control terminals 40, 41 and 42 of FIG. 2 are shown in FIG. 3. Either of ternary level signals V*c*, V*d* and V*e* is used depending on whether the operation involved is "read," "write" or "associate." In the figure, solid lines represent the control signals from the control terminal 40, dotted lines control signals from the control terminal 41 and chain lines control signals from the control terminal 42. Symbols T1 and T2 show the periods during which the information of logic 0 and 1 is written in the memory cell 31. Symbols T3 and T4 show associating periods during which the content of the memory cell 31 is being identified by the information of logic 0 and 1, respectively. Symbol T5 indicates the period when the content of the memory cell is read out.

As can be seen from the drawing, the voltage generators 43 and 44 produce voltage V*c* and V*e*, respectively, while the arrangement is such that the voltage generator 45 produces voltage V*c* or V*d*.

The operation of the circuit of FIG. 2 will be now explained with reference to the characteristic diagram of FIG. 3.

By way of explanation, it is assumed that when the transistors 35 and 36 are conductive and cut-off, respectively, the information of logic 1 is stored in the memory cell 31, whereas when the transistors 36 and 35 are conductive and cut-off, respectively, the information of logic 0 is stored in the memory cell.

1. Operation at the Time of Writing

The control signal from the control terminal 49 energizes the peripheral circuits 32, 33 and 34, whereupon the voltage V*c* is produced from the voltage generator 45 of the peripheral circuit 34 and is applied to the control terminal 40 of the memory cell 31. At the time of writing the information of logic 0 into the memory cell 31, the voltage V*c* is produced from the voltage generator 43 of the peripheral circuit 32, while at the same time the voltage V*e* is produced from the voltage generator 44 of the peripheral circuit 33. These voltages V*c* and V*e* are applied to the control terminals 41 and 42, respectively. When the information of logic 1 is written into the memory cell 31, on the other hand, the voltages V*e* and V*c* are produced from the voltage generators 43 and 44 of the peripheral circuits 32 and 33 and are applied to the control terminals 41 and 42 respectively. In this way, it is possible to write in the memory cell 31 the information of logic 0 and 1 as desired.

2. Operation at the Time of Reading

The peripheral circuits 32 to 34 are energized by the control signal from the control terminal 50. In other words, the voltage V*e* is generated by the voltage generators 43 and 44 of the peripheral circuits 32 and 33 and is applied to the control terminals 41 and 42. On the other hand, the voltage V*d* is produced from the voltage generator 45 of the peripheral circuit 34 and is applied to the control terminal 40.

Under this condition, when the information of logic 1 is stored in the memory cell 31, current flows in the output terminal 46 of the peripheral circuit 32 through the control terminal 41. When the information of logic 0 is stored in the memory cell 31, on the other hand, current flows in the output terminal 47 of the peripheral circuit 33 through the control terminal 42. In this manner, information stored in the memory cell 31 is read out.

3. Operation at the Time of Associating

The control signal from the control terminal 51 causes the peripheral circuits 33 and 34 to be energized. The voltage V*d* produced at the voltage generator 45 of the peripheral circuit 34 is applied to the control terminal 40. If the information supplied from an external source is logic 0, the voltage V*c* and V*e* are produced from the voltage generator 43 of the peripheral circuit 32 and the voltage generator 44 of the peripheral circuit 33, respectively, and are applied to the control terminals 41 and 42, respectively. When the information of logic 1 is stored in the memory cell 31, the current in the control terminal 41 changes its direction and flows toward the control terminal 40 into the the output terminal 48 of the peripheral circuit 34. When the information of logic 0 is stored in the memory cell, on the other hand, the voltage at the control terminal 42 is lower than that at the control terminal 40 and therefore no current flows into the output terminal 48.

By contrast, if the information supplied from an external source is logic 1, the voltages $Ve$ and $Vc$ are produced from the voltage generators 43 and 44, respectively, of the peripheral circuits 32 and 33 and are applied to the control terminals 41 and 42 respectively.

When the information of logic 1 is stored in the memory cell 31, the voltage at the control terminal 41 is lower than that at the control terminal 40 and therefore no current flows into the output terminal 48. When the information of logic 0 is stored in the memory 31, on the other hand, the current in the control terminal changes its direction and flows toward the control terminal 40 into the output terminal 48.

It will thus be seen that only when the external information for association does not coincide with the information stored in the memory cell 31, current flows into the output terminal 48 as the result of association.

The operations explained in the paragraphs 1 and 2 above are the same as that of the bistable circuit used in the conventional memory cell, but the paragraph 3 involves the operation characteristic of the present invention.

Explanation will be made now of the manner in which the voltage $Vd$ is set. The voltage $Vd$ to be applied to the control terminal 40 must be set in such a range as to maintain the information of the memory cell 31 unchanged. For this purpose, the following equation must be satisfied:

$$Ve + 0.2 \leqq Vd \leqq Ve + 0.6 \qquad (1)$$

where $Vd$ is the voltage applied to the control terminal 40 as described above and $Ve$ is the voltage lower than those applied to the control terminals 41 and 42.

From the Equation 1 above, it is apparent that the values of 0.2 volts and 0.6 volts are fixed depending on the characteristics of the transistors included in the bistable circuit shown in FIG. 2 and therefore the tolerance of the voltage $Vd$ is 0.4 volts.

Figure 4:
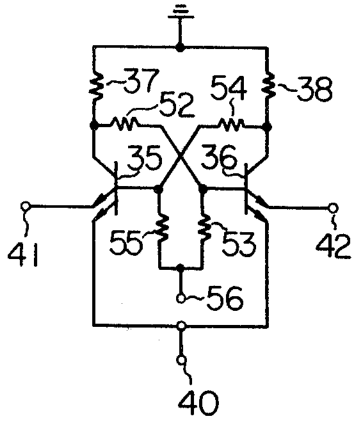
FIG. 4 shows a circuit of the associative memory according to another embodiment of the invention.

The arrangement of the associative memory according to another embodiment of the invention is shown in FIG. 4. The bases and collectors of the transistors 35 and 36 are connected not directly but in such a manner that the base of one of the transistors and the collector of the other transistor are connected with each other through a circuit comprising a voltage divider of resistors 52 and 53 or a voltage divider of resistors 54 and 55, and a bias power terminal 56.

This arrangement of the memory cell is provided with the intention of decreasing the base voltage of the multi-emitter transistor 35 or 36 thereby to increase the tolerance of the voltage $Vd$ which is applied to the control terminal 40.

It is assumed that the respective resistance of the resistors 37 and 38 is 3 KΩ, the respective resistance of the resistors 52 and 54 is 10 KΩ, the respective resistance of the resistors 53 and 55 is 40 KΩ, the bias voltage applied to the power terminal 56 is −5V and the voltage $Ve$ is −3V. Then the Equation 1 above may be expressed as $$-3 + 0.2 \leqq Vd \leqq -3 + 1.4$$

From this it is seen that the tolerance of $Vd$ is increased from 0.4V to 1.2V.

Figure 5:
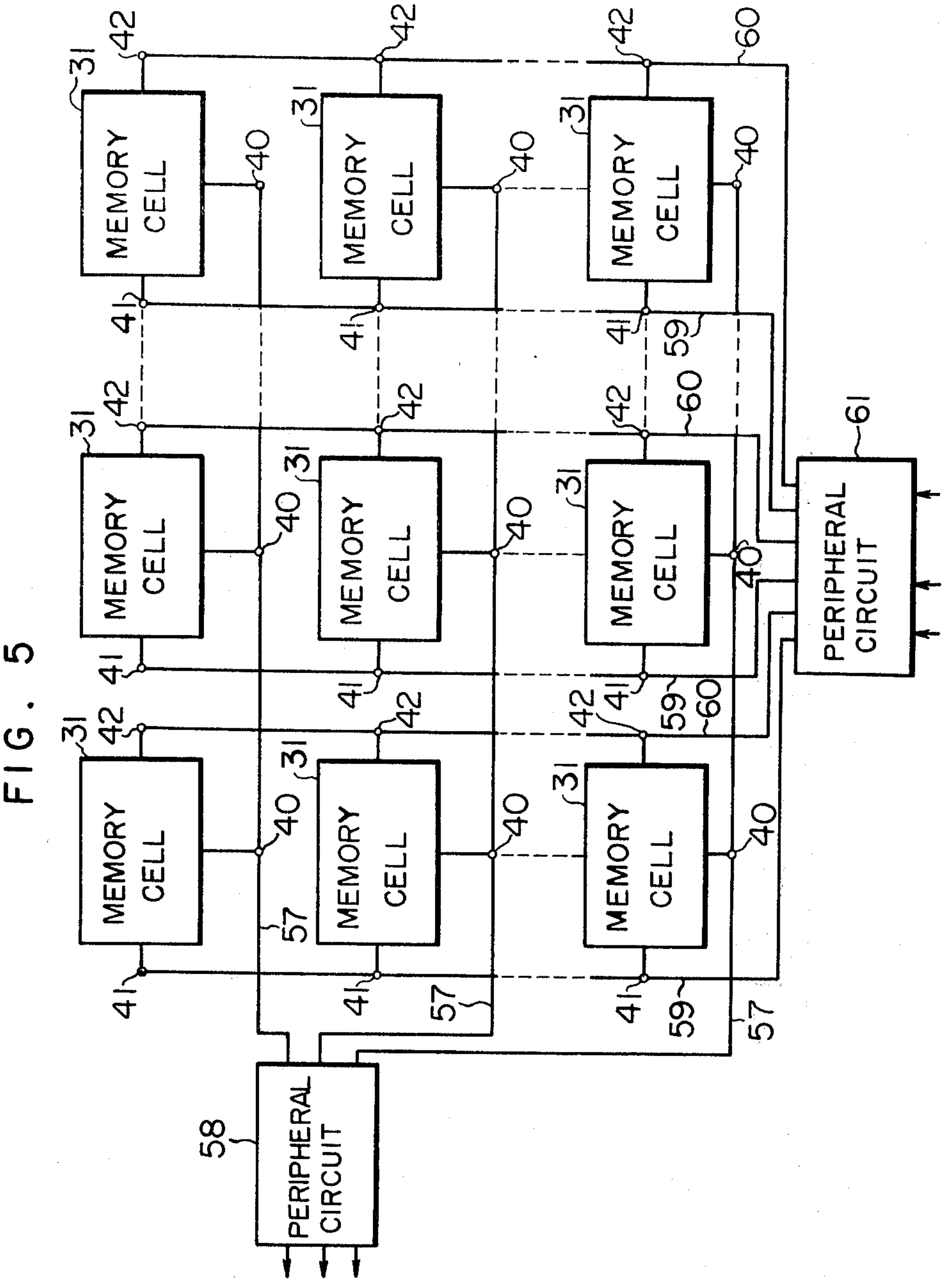
FIG. 5 is a diagram showing an associative memory comprising the memory cells of FIGS. 2 or 4.

An associative memory device employing the associative memory cells of FIGS. 2 or 4 is illustrated in FIG. 5. This associative memory device comprises the memory cells 31 including the control terminals 40, 41 and 42, a peripheral circuit 58 connected through the lines 57 to the control terminals 40 of the memory cells 31, a peripheral circuit 61 connected through the lines 59 and 60 to the control terminals 41 and 42 of the memory cells 31, and the peripheral circuits 58 and 61 corresponding to the peripheral circuits 34 and 32 of FIG. 2, respectively.

Figure 6:
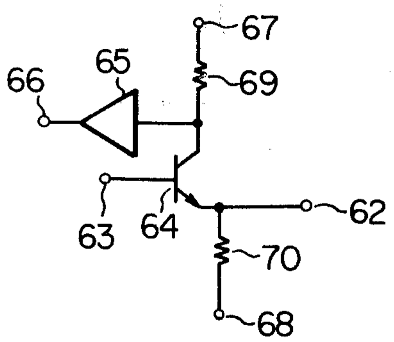
FIGS. 6 and 7 are circuit diagrams showing parts of actual arrangements of peripheral circuits used with the associative memory according to the invention.

The arrangement of an embodiment of the final stage of the peripheral circuit 58 of FIG. 5 is shown in FIG. 6.

In FIG. 6, reference numeral 62 shows a terminal connected to the line 57 of FIG. 5, numeral 63 an input terminal for control signals, numeral 64 a transistor with its base connected to the input terminal 63 and its emitter connected to the terminal 62, numeral 65 a sense amplifier connected to the collector of the transistor 64, numeral 66 an output terminal of the sense amplifier 65, numerals 67 and 68 power terminals, numeral 69 a resistor inserted between the collector of the transistor 64 and the power terminal 67, and numeral 70 a resistor inserted between the emitter of the transistor 64 and the power terminal 68.

Although a peripheral circuit corresponding to a single line 57 is shown in FIG. 6, it is needless to say that such a circuit is provided for each line.

Figure 7:
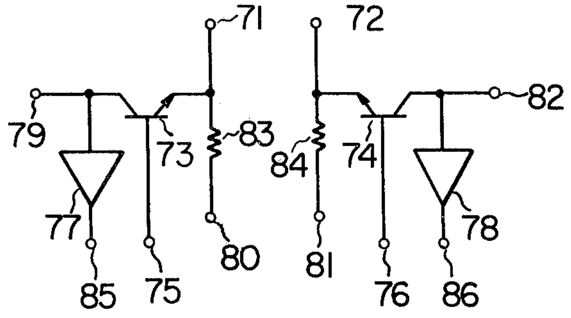

The arrangement of an embodiment of the final stage of the peripheral circuit 61 of FIG. 5 is illustrated in FIG. 7.

In FIG. 7, reference numerals 71 and 72 show terminals connected to the lines 59 and 60, respectively of FIG. 5, numerals 73 and 74 transistors with their emitters connected with the terminals 71 and 72, respectively, numerals 75 and 76 input terminals for applying control signals to the bases of the transistors 73 and 74, respectively, numerals 77 and 78 sense amplifiers connected to the collectors of the transistors 73 and 74, numerals 79 to 82 power terminals, numeral 83 a resistor inserted between the terminals 71 and 80, numeral 84 a resistor inserted between the terminals 72 and 81 and numerals 85 and 86 the output terminals of the sense amplifiers 77 and 78.

Although FIG. 7 shows only those peripheral circuits corresponding to a pair of lines 59 and 60, it is needless to say also in this case that peripheral circuits are provided for each pair of lines.

The operation of the memory device of FIG. 5 will be now explained with reference to actual examples of arrangements shown in FIGS. 6 and 7.

1. Operation at the Time of Writing

A high voltage is applied to the input terminal 63 of the peripheral circuit 58 shown in FIG. 6, whereby the emitter voltage of the transistor 64 is increased thereby to apply the voltage $Vc$ to the line 57 through the terminal 62. When the information of logic 0 is written in the memory cell 31, a high voltage is applied to the input terminal 75 of the peripheral circuit 61 of FIG. 7. As a result, the emitter voltage of the transistor 73 rises so that the voltage $Vc$ is applied to the line 59 through the terminal 71. On the other hand, no voltage is applied to the input terminal 76, while the voltage $Ve$ is applied to the terminal 72 from the power terminal 81 and then to the line 60.

When the information of logic 1 is written in the memory cell 31, by contrast, a high voltage is applied to the input terminal 76 of the peripheral circuit 61 thereby to increase the emitter voltage of the transistor 74 so that the voltage $Vc$ is applied to the line 60 through the terminal 72, while at the same time no voltage is applied to the input terminal 75, the voltage $Ve$ being applied to the line 59.

In this way, it is possible to write the information of logic 0 or 1 in the memory cell 31.

2. Operation at the Time of Reading

A very small voltage is applied to the input terminal 63 of the peripheral circuit 58 shown in FIG. 6, whereupon the potential of the emitter of transistor 64 is increased slightly thereby to apply the voltage $Vd$ to the line 57. On the other hand, no voltage is applied to the input terminals 75 and 76 of the peripheral circuit 61 of FIG. 7, the voltage $Ve$ being applied to the lines 59 and 60.

Under this condition, if the information of logic 1 is stored in the memory cell 31, current flows through the control terminal 41, through the line 59, through the terminal 71 to the resistor 83. So, the potential of the emitter of the transistor 73 undergoes a change which is transformed into a change in the collector voltage of the transistor 73. This change in the collector voltage is sensed by the sense amplifier 77 and a corresponding output is produced from the output terminal 85.

When the information of logic 0 is stored in the memory cell 31, by contrast, current flows to the resistor 84 through the control terminal 42, line 60 and terminal 72. As a result, the emitter potential of the transistor 74 undergoes a change which is sensed by the sense amplifier as in the preceding case to produce an output from the output terminal 86.

Thus, the information stored in the memory cell 31 is capable of being read out.

3. Operation at the Time of Associating

A very small voltage is applied to the input terminal 63 of the peripheral circuit 58 shown in FIG. 6, whereby the voltage $Vd$ is applied to the line 57.

If the information supplied from an external source is logic 0, the voltages $Vc$ and $Ve$ are applied to the lines 59 and 60, respectively, as in the case of writing operation. Under this condition, when the information of logic 1 is stored in the memory cell 31, current flows to the resistor 70 through the line 57 and the terminal 62, so that the base-emitter voltage of the transistor 64 undergoes a change which takes the form of a change in the collector voltage of the transistor 64. This change is sensed by the sense amplifier 65 and produced from the output terminal 66. That is to say, an anticoincidence signal is produced from the terminal 66. When the information of logic 0 is stored in the memory cell 31, the potential of the control terminal 42 is lower than that of the control terminal 40 and therefore no output is produced from the sense amplifier 65 of the peripheral circuit 58.

If the information of logic 1 is supplied from an external source, by contrast, the voltages $Ve$ and $Vc$ are applied to the lines 59 and 60, respectively. Therefore, when the information of logic 1 is stored in the memory cell 31, the potential of the control terminal 41 is lower than that of the control terminal 40, so that no voltage is produced from the sense amplifier 65 of the peripheral circuit 58. When the information of logic 0 is stored in the memory cell 31, current flows through the line 57 and terminal 62 to the resistor 70, whereby the collector voltage of the transistor 64 undergoes a change which is produced from the terminal 66 as an anticoincidence signal through the sense amplifier 65, thus enabling the association of the content of the memory cell 31 with that supplied from an external source.

It is needless to say that the voltages at the power terminals 67, 68, 79, 80, 81 and 82 the resistance values of the resistors 69, 70, 83 and 84 in FIGS. 6 and 7 are so selected that the voltages $Vc$, $Vd$ or $Ve$ is capable of being applied to the terminals 62, 71 and 72 under a predetermined condition.

Figure 8:
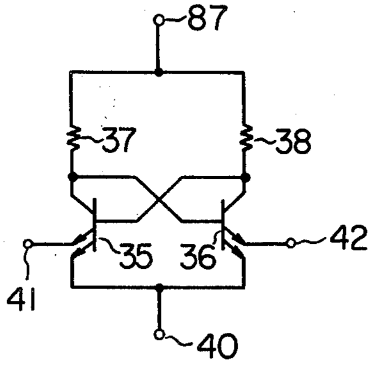
FIG. 8 shows a circuit of the associative memory according to still another embodiment of the invention.

The arrangement of the associative memory cell according to still another embodiment of the invention is shown in FIG. 8. This arrangement is substantially identical with that shown in FIG. 2, the only difference being that in the embodiment of FIG. 8 the voltage applied to a terminal 87 is variable.

In other words, when the memory is not in associating or writing operation, the voltage applied to the terminal 87 is lowered, while on the other hand the voltage applied to the terminal 87 is made higher during the associating or writing operation. In this manner, the power is effectively distributed in the memory cell, thereby reducing power consumption.

Figure 9:
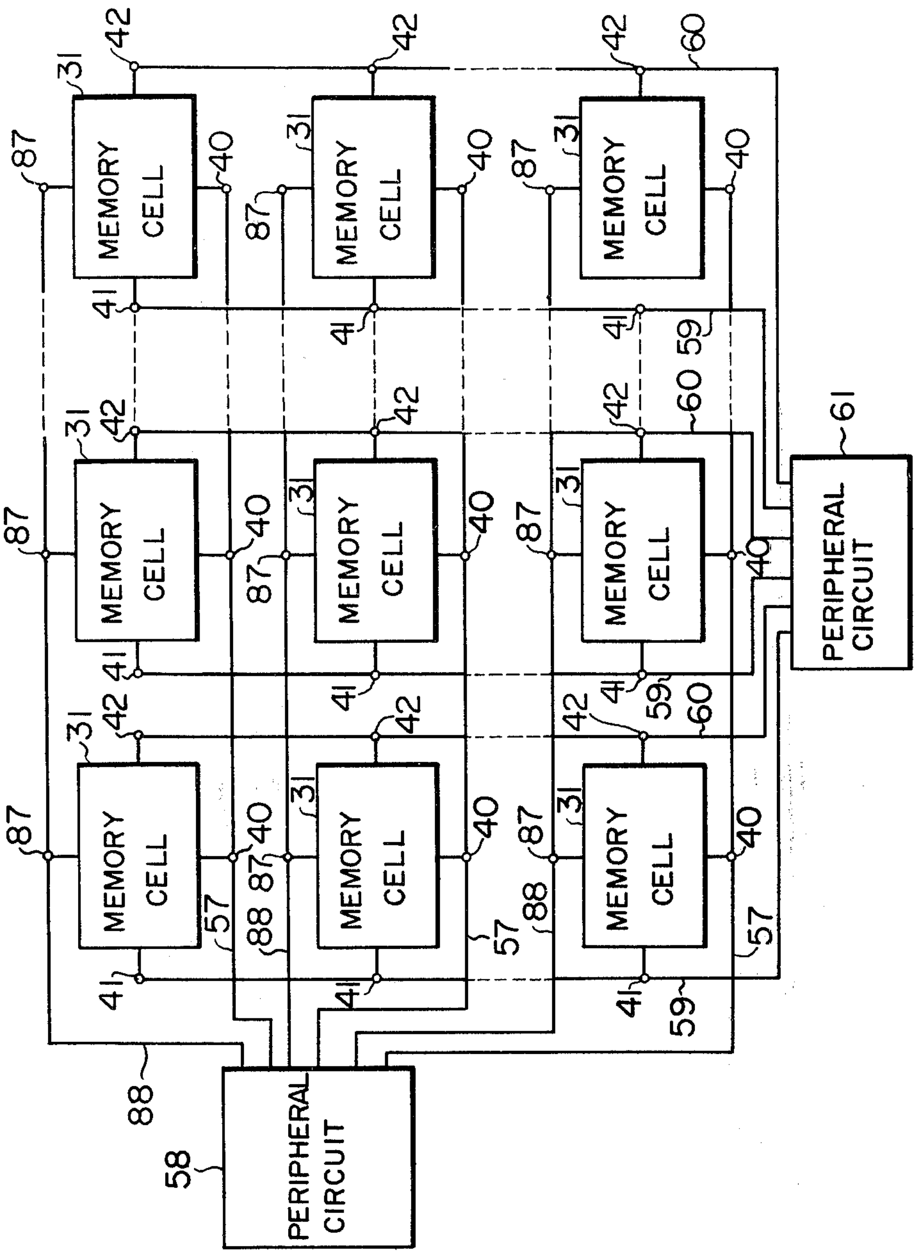
FIG. 9 shows an associative memory according to the invention comprising the memory cells of FIG. 8.

An associative memory device comprising the memory cells shown in FIG. 8 is illustrated in FIG. 9. In the figure, the terminal 87 of the memory cell 31 is connected to the line 88, which is in turn connected to the peripheral circuit 58, the remainder of the arrangement being the same as that of FIG. 5.

In the arrangement under consideration, the peripheral circuit 58 so functions as to apply a high voltage to the line 88 at the time of associating and writing operations, while on the other hand a low voltage is applied thereto for the other operations. That is the only operational difference from the embodiment of FIG. 5.

Although all of the above-described embodiments employ a multi-emitter transistor with two emitters, the invention is of course applicable to the memory cell using a multi-emitter transistor having three or more emitters.

We claim:

1. An associative memory comprising: a bistable circuit including first and second transistors each having at least two emitters, power supply means connected commonly to the collectors of said first and second transistors, bias power supply means, first voltage divider means connected between the collector of said first transistor and said bias power supply means and having an intermediate point connected to the base of said second transistor for dividing the output voltage of said collector of said first transistor to apply the divided voltage to said base of said second transistor, and second voltage divider means connected between the collector of said second transistor and said bias power supply means and having an intermediate point connected to the base of said first transistor for dividing the output voltage of said collector of said second transistor to apply the divided voltage to said base of said first transistor; first and second control means connected respectively with the first emitters of said first and second transistors for applying thereto a high or low voltage, said high and low voltages being applied respectively to said first emitters at the time of associating operation; and third control means connected commonly to said second emitters of said first and second transistors for applying thereto said high voltage or an intermediate voltage between said high voltage and said low voltage, said intermediate voltage being applied to said second emitters at the time of associating operation.

2. An associative memory according to claim 1, in which said bistable circuit further includes first and second resistors, said collectors of said first and second transistors being connected respectively through said first and second resistors to said power supply means; said first and second voltage divider means including third and fourth resistors, respectively, connected between said bases of a respective one of said first and second transistors and said bias power supply means.

3. An associative memory according to claim 1, in which each of said first, second and third control means comprises a third transistor, connecting means for connecting the emitter of said third transistor to the emitters of said first and second transistors, a control signal input terminal connected to the base of said third transistor, a first resistor having first and second terminals, said first terminal of said first resistor being connected to the emitter of said third transistor, first and second power supply terminals connected respectively to said second terminal of said first and to the collector of said third transistor, a sense amplifier having input and output sides, said input side being connected to the collector of said third transistor, and an output terminal connected to said output side of said sense amplifier, and said third control means further comprises a second resistor, the collector of said third transistor being connected through said second resistor to said second power supply terminal.

4. An associative memory according to claim 1, in which said bistable circuit further includes first and second resistors, said collectors of said first and second transistors being connected respectively through said first and second resistors to said power supply means.

* * * * *